United States Patent [19]

Owsen

[11] Patent Number: 4,671,774

[45] Date of Patent: Jun. 9, 1987

[54] ALL TERRAIN VEHICLE

[76] Inventor: Paul J. Owsen, Century Research & Development, 2410 Aero Park Ct., Traverse City, Mich. 49684

[21] Appl. No.: 787,483

[22] Filed: Oct. 15, 1985

Related U.S. Application Data

[63] Continuation-in-part of Ser. No. 461,813, Jan. 28, 1983, Pat. No. 4,568,294.

[51] Int. Cl.⁴ .............................................. B63H 1/34
[52] U.S. Cl. ...................................... 440/95; 114/270; 114/313; 114/333; 305/35 EB
[58] Field of Search ............... 114/58, 67 R, 121, 312, 114/313, 330, 333, 337, 270, 125; 440/90, 95–100; 305/35 EB, 39, 47; D12/141–145; D15/24

[56] References Cited

U.S. PATENT DOCUMENTS

| | | | |
|---|---|---|---|
| 1,788,440 | 1/1931 | Prell | 114/270 |
| 2,091,958 | 9/1937 | Braga | 440/95 |
| 2,413,850 | 1/1947 | Swennes | 114/270 |
| 3,180,305 | 4/1965 | Gower-Rempel | 114/270 |
| 3,311,424 | 3/1967 | Taylor | 305/12 |
| 3,385,255 | 5/1968 | Raymond et al. | 114/270 |
| 3,446,305 | 5/1969 | Cannon | 280/111 |
| 3,487,802 | 1/1970 | Roy | 114/270 |
| 3,559,611 | 2/1971 | Cushman | 114/270 |
| 3,976,025 | 8/1976 | Russell | 114/270 |
| 4,459,932 | 7/1984 | Hildebrand | 114/270 |

Primary Examiner—Sherman D. Basinger
Assistant Examiner—Stephen P. Avila
Attorney, Agent, or Firm—Krass & Young

[57] ABSTRACT

An all-terrain vehicle driven by endless propulsion tracks. The wheels are sufficiently bouyant to maintain the upper section of the endless track above the water line when the vehicle is fully loaded. A series of generally linear cleat segments project from the outer surface of the endless track and extend substantially across the width of the track. The cleat segments are arranged in a zig-zag pattern about the length of the endless track in order to provide a combination of forward and lateral thrust components as the endless track is rotated about the wheels. The generally longitudinal character of the cleat pattern reduces the chance of mud and loose soil being carried on the cleats to the top portion of the endless track. In one embodiment of the invention, four pneumatic tire wheel assemblies are provided in longitudinally spaced relation along each side of the vehicle and a pair of endless tracks, each trained around two adjacent wheel assemblies, are provided on each side of the vehicle. The endless tracks include a rib along the inner periphery of the track which guides in a circumferential groove in the pneumatic tires of the wheel assemblies. The tension of the endless belts is adjusted by selectively varying the pressure of the pneumatic tires and the belts are precluded from moving laterally on the wheel assemblies by the described groove and rib engagement. A wheel motor drives each endless belt so that the vehicle may continue to be driven even in the event of failure of one of the endless track assemblies on either side of the vehicle.

6 Claims, 9 Drawing Figures

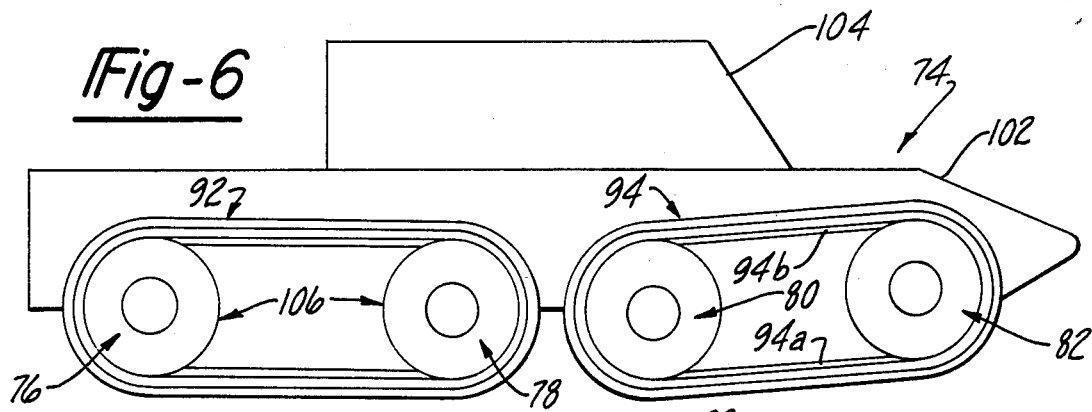
Fig-6
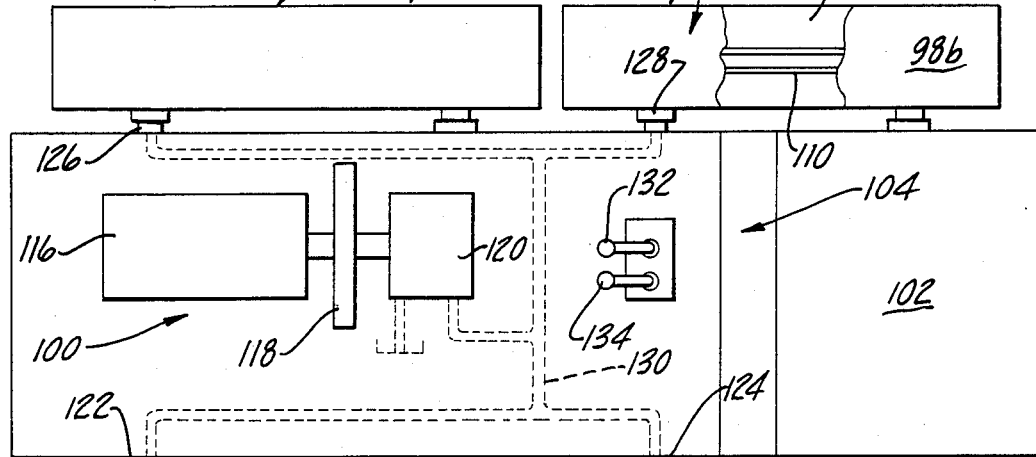
Fig-7
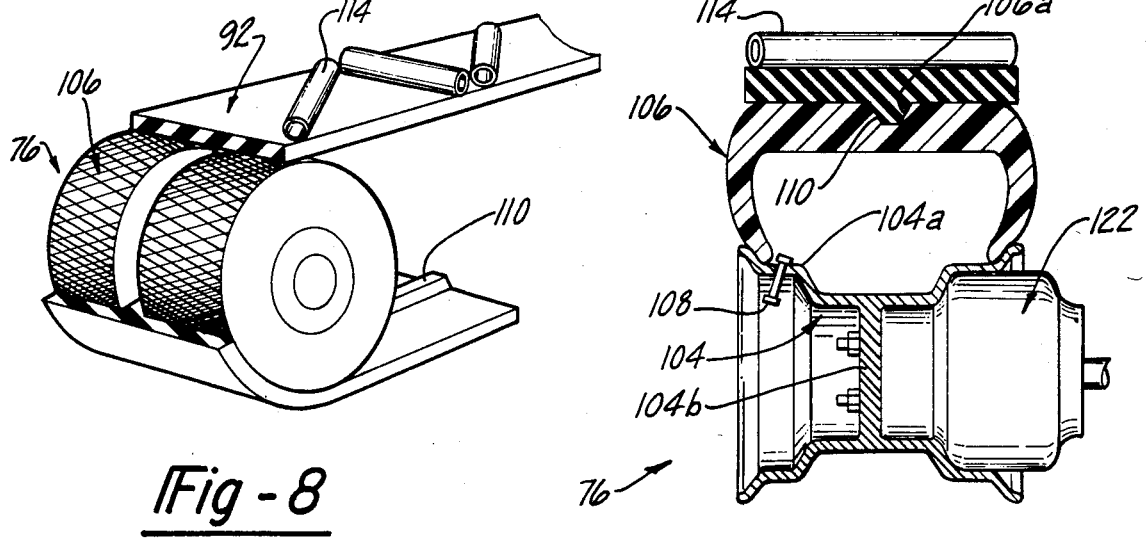
Fig-8
Fig-9

ALL TERRAIN VEHICLE

RELATED APPLICATION

This invention is a continuation-in-part of U.S. patent application Ser. No. 461,813, filed Jan. 28, 1983 now U.S. Pat. No. 4,568,294.

TECHNICAL FIELD

This invention relates generally to all-terrain amphibious vehicles and more particularly to vehicles driven by endless tracks.

BACKGROUND ART

All-terrain amphibious vehicles which employ endless tracks as means for propulsion are widely known in the art. However, there are several problems associated with the use of endless propulsion tracks which greatly reduce the performance and maneuverability of the vehicles, both on land and in the water.

In many of the known designs, the forces necessary to propel the vehicle are generated by the endless track by virtue of a series of projections or cleats extending substantially across the width of the outer surface of the track. The cleats are generally oriented perpendicular to the path of travel of the endless tracks. Thus, as the endless track is rotated, the action of the cleats on the terrain generates sufficient propulsion to provide for forward motion. However, in muddy or loose soil, these cleats tend to carry the mud or loose soil onto the track thus increasing the weight of the propulsion mechanism and decreasing its efficiency. In addition, the propulsion forces generated by the cleats are generally in a rearward direction, and provide little or no lateral stability to the vehicle.

U.S. Pat. No. 3,311,424 to Taylor, issued Mar. 28, 1967 discloses a track device comprising a belt driven soft roller. One embodiment of the Taylor device discloses a clear arrangement in the form of a series of chevrons which extend across the width of the belt. While this cleat arrangement provides propulsion forces containing vector components in a lateral direction with respect to the vehicle, these lateral components are directed inwardly towards the center of the cleat and, thus only marginally affect the lateral stability of the vehicle. In addition, mud and loose soil may collect at the center point of each of the chevron cleats as the track moves over the terrain.

U.S. Pat. No. 2,091,958 to Braga issued on Sept. 7, 1937, discloses a boat employing an endless propulsion belt. Braga further employs a series of stationary baffles which remove water which has accumulated on the surface of the belt. It should be noted that until the boat has reached cruising speed, the water line is above the entire belt mechanism. Since the motion of the upper surface of the belt is in a direction opposite to that of the lower surface of the belt, a considerable amount of drag is created.

Further, in many of the know all-terrain amphibious vehicle designs, difficulty is experienced in initially providing proper tension for the endless tracks and in maintaining proper tension over extended period of usage.

Also, the prior art endless track designs all suffer from the disadvantage that failure of one of the endless tracks on either side of the vehicle substantially totally disables the vehicle.

The present invention is directed to overcoming the problems as set forth above.

DISCLOSURE OF THE INVENTION

In accordance with one aspect of the present invention, an all-terrain vehicle is driven by specially designed endless propulsion tracks. A series of generally linear cleat segments projecting from the outer surface of the endless track and extending substantially across the width of the endless track generates propulsion forces which drive the vehicle. These cleats are arranged in a zig-zag pattern about the length of the endless track in order that the propulsion forces generated by the cleat segments have oppositely directed lateral components as well as forward thrust components. The lateral force components are directed outwardly from the endless track and provide increased lateral stability for the vehicle. In addition, the construction of the cleat pattern reduces the likelihood of mud and loose soil being carried by the cleats to the top of the belt.

In one embodiment of the invention, the endless track is mounted upon a series of wheels positioned along the length of the vehicle. Each of the wheels is large enough in diameter that it supports internal portions of both the upper surface and lower surface of the endless track.

In one embodiment, the wheels are each filled with a lightweight material such as styrofoam plastic, to increase their buoyancy. These large buoyant wheels serve to keep the upper portion of the endless propulsion track above the water level even when the vehicle is in a fully loaded condition. In addition, one or more of the forward-most wheels are of a reduced diameter and are mounted such that the outline of the endless track, when viewed from the side of the vehicle, defines an upward sloping surface along the front lower portion of the track. As the vehicle moves forward in the water, this sloping surface contacts the water in such a way that it tends to lift the front end of the vehicle further out of the water, thus further reducing the drag.

To prevent any lateral slippage of the endless track across the surface of the wheels, a slot is provided in the center of each of the wheels along their circumference which engages a centered ridge projecting along the entire length of the inner surface of the endless track. This ridge-slot arrangement, together with the clear configuration, keeps the track centered on the wheels.

In an alternative design the vehicle may be employed as a submarine. The wheels, in this embodiment, are hollow and may be selectively filled to cause the vehicle to submerge.

According to a further feature of the invention, the vehicle comprises a body; a plurality of pneumatic tires journalled on the body at longitudinally spaced locations along each side of the body and including at each side of the body at least one tire adjacent the front of the body and another tire adjacent the rear of the body; and endless track means at each side of the body trained around all of the tires and providing the sole means of ground engagement for the vehicle. With this arrangement, initial and subsequent adjustment of the tension of the endless tracks is provided by simply selectively inflating the tires about which the track is trained.

According to a further feature of the invention, four penumatic tires are provided at longitudinally spaced locations along each side of the vehicle and two endless tracks, each trained around a pair of adjacent tires, are provided at each side of the vehicle. With this arrangement, the tension of the endless tracks may be readily and individually adjusted and the vehicle will be able to proceed even in the event of track breakage since the other track on the affected side of the vehicle will be capable of providing propulsion for the vehicle.

According to a further feature of the invention, the pneumatic tires each include a circumferential groove and the endless track trained around the tires includes a longitudinally extending rib on the inner periphery thereof guiding in the grooves in the tires. This arrangement precludes lateral movement of the track on the tires and ensures that the tracks will not be disengaged from the tires.

BRIEF DESCRIPTION OF THE DRAWINGS

FIG. 6 is a side elevational view of a second embodiment of the invention;

FIG. 7 is a top view of the embodiment of FIG. 6;

FIG. 8 is a fragmentary perspective view of the FIG. 6 embodiment; and

FIG. 9 is a fragmentary cross-sectional view of a wheel assembly of the FIG. 1 embodiment.

DETAILED DESCRIPTION OF THE PREFERRED EMBODIMENTS

Figure 1:
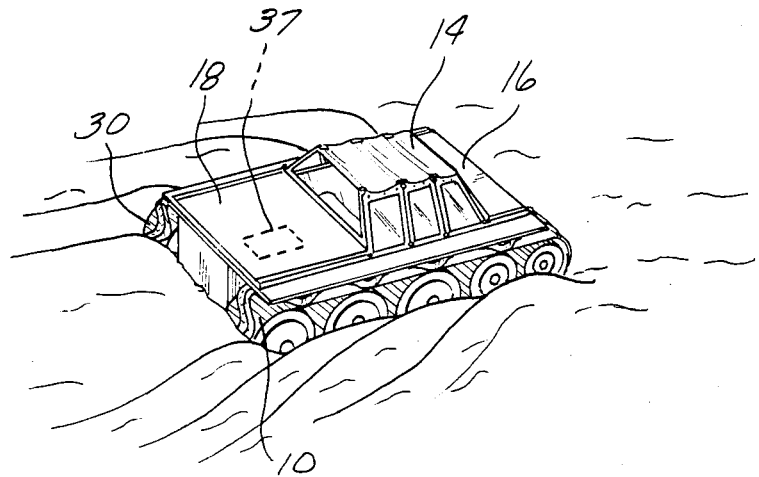
FIG. 1 is a perspective view of one embodiment of the present invention.

Referring to FIG. 1, one embodiment of the current invention is shown in operation in water. The vehicle is propelled through the water by a pair of endless propulsion tracks 10 and 30 located on either side of the vehicle. The tracks are supported and completely surround a series of large buoyant wheels 20-28. Other features shown which may be included in an embodiment of the invention are a portable cockpit cover 14, which may be made of canvas of similar material, a storage compartment 16 for the portable cockpit cover, and an engine and general storage compartment 18 and a pair of side curtains 12 and 32 which cover the top surface of the endless propulsion tracks 10 and 30.

Figure 2:
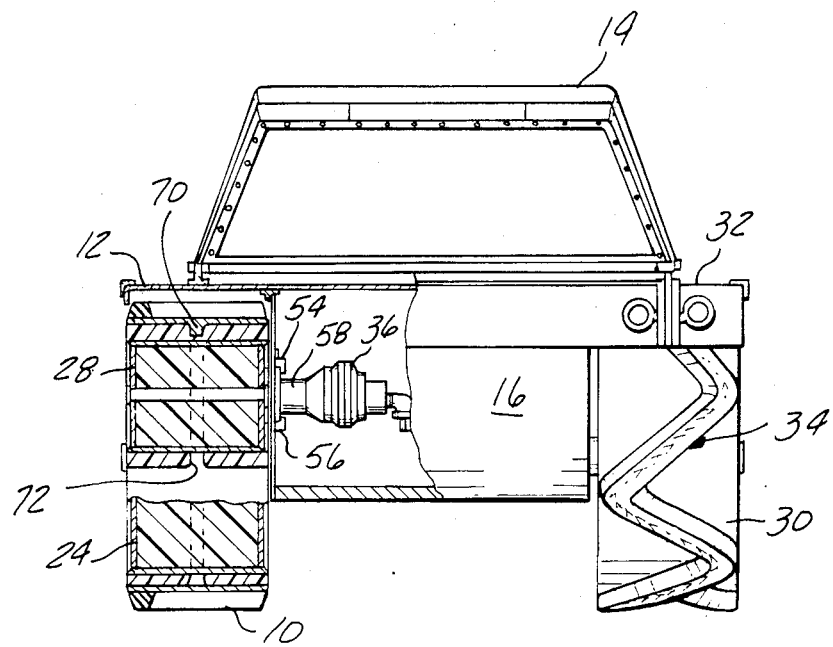
FIG. 2 is a fragmented end view of the embodiment of FIG. 1 showing the front left drive wheel assembly in cross section.
Figure 4:
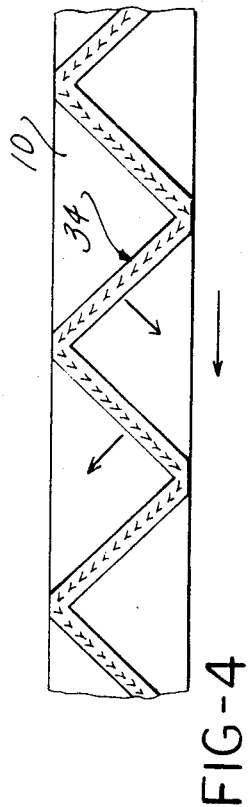
FIG. 4 is a bottom view of portions of the endless propulsion track viewed along lines 4—4 of FIG. 3.

Referring now to FIGS. 2 and 4, a continuous cleat 34 is secured to the top surface of the endless track 10 for the purpose of providing propulsion forces on land and water. It should be noted that the cleat design shown is a zig-zag pattern which extends about the entire length of the outer surface of the endless tracks.

The smaller front wheels 28 for each track are rotated by separate hydraulic motors, one of which is shown in FIG. 2 as motor 36. The hydraulic motors are, in turn, powered by a single air cooled gasoline engine 37 driving a pair of variable hydrostatic pumps (not shown), one for each motor, mounted in compartment 18. A set of manual levers (not shown in the cockpit are used to control the pumps which, in turn, control the rotational speed and direction of motors 36.

Figure 3:
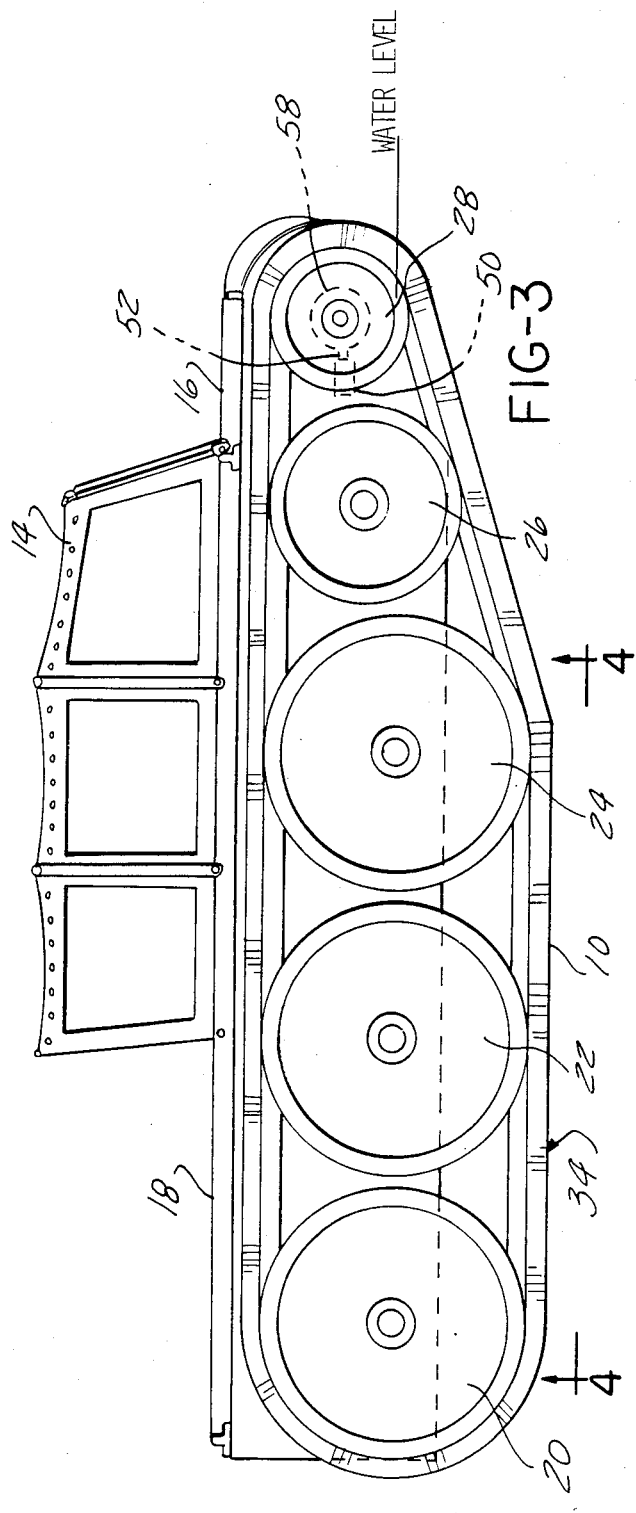
FIG. 3 is a side view of the embodiment of FIG. 1.

The front wheels 28 serve as driver pulleys for their respective tracks. Wheels 28 are positioned in frictional contact with the inner surface of the track to thereby transfer their rotational movement into corresponding rotation of the engaged track. In the preferred embodiment, control of the tension on the tracks is accomplished by way of a pair of hydraulically actuated cylinders, one for each of the front wheels 28. In FIG. 3, cylinder 50 s shown with a piston 52 positioned perpendicular to the axis of rotation of the wheel 28. As shown in FIG. 2, wheel 28 is slidably mounted within flanges 54, 56 in a horizontal direction. Piston 52, when actuated, presses on an extension 58 of the wheel shaft and causes the wheel to move press against the track and hold it taut.

Referring now to FIG. 3, it should be noted that each of the drive wheels 20-28 is of sufficient diameter that the endless track 10 surrounds the wheels and contacts each of the wheels on both its upper and lower outer surfaces. In the embodiment shown, the forward wheels 28 and 26 are of a smaller diameter than the three rear wheels 20-24. Mounting each of these wheels so that their top surfaces are aligned with the top surfaces of the larger rear wheel provides the endless track 10 with an upward sloping contact surface in the lower front area of the track assembly. When the vehicle·is travelling in a forward direction in the water, the water first contacts this upward sloping surface, thus providing lift forces which tend to further raise the vehicle in the water and reduce drag. As will be appreciated by one skilled in the art, the number of reduced diameter forward wheels may be altered if a sharper or more gradual forward slope is desired.

Figure 5:
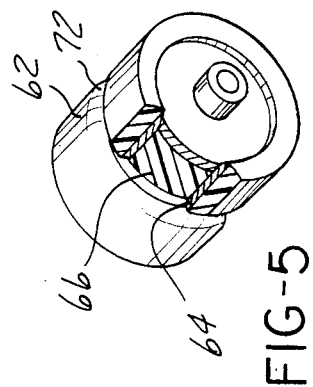
FIG. 5 is a fragmented perspective view of a wheel assembly for the embodiment of FIG. 1.

Referring now to FIG. 5, each of the wheels 20-28 is composed of several different lightweight materials. The ouer shell 62 may be made of a rigid molded plastic material. An intermediate layer 64 composed of glue or similar adhesive secures the outer layer 62 to the inner layer 66 which may be composed of a lightweight material such as styrofoam plastic. Because of substantial portion of the volume of these wheels is composed of a lightweight material such as styrofoam, the use of relatively large size wheels 20-28 greatly increases the buoyancy of the vehicle. Thus, the water level for the vehicle of the present invention is below the upper portion of the endless track 10, eliminating any negative propulsion forces that might be generated if the upper portion of the track 10 were submerged and greatly increasing the net propulsion forces in the forward direction.

However, it has been discovered that the unique clear design still provides adequate forward propulsion even if the upper portion of the track is below water level. Consequently, the vehicle can be easily modified so as to serve as a submarine. Such modifications would include a water tight enclosure for the cockpit area and the use of hollow wheels which may be selectively filled with water or the like serving as ballast to cause the vehicle to submerge.

FIG. 4 shows in more detail the zig-zag pattern of the cleat 34 on the endless propulsion track 10 used in the preferred embodiment of the present invention. The track and cleat may be made of any suitable material. In this embodiment the track measures 27 feet in length and 16 inches in width made of fiber reinforced neoprene rubber. The cleats which extend several inches from the major surface of the track can be made of similar rubber or plastic material. Each linear segment of the cleat 34 extends substantially across the width of the endless track 10 at an angle of approximately 45 degrees relative to the edge of the endless track 10. Each of the segments are connected to immediately adjoining segments to form a 90 degree zig-zag pattern that runs the entire length of the endless propulsion track 10. It should be noted that the propulsion force generated by each of the cleat segments contains components in outwardly opposing lateral directions as well as in the direction of travel of the vehicle, as shown by the arrows. The lateral forces generated by each of the cleat segments tend to increase the lateral stability of the vehicleand keep the track centered on the wheels. It will also be appreciated by those skilled in the art, that because each of the cleat segments is oriented upon the endless track 10 in a diagonal fashion, the individual cleat segments are less likely to carry mud and loose soil up to the top surface of the endless track.

Referring again to FIG. 2, the endless propulsion track 10 may be provided with a center ridge 70 which extends along the length of the inside surface of the endless propulsion track 10 and engages a slot 72 located in the center of the surface of each of the wheels. The center ridge 70 prevents lateral slippage of the endless propulsion track 10 from the top surface of the wheels 20-28.

Reference is now made to the second embodiment of the invention shown in FIGS. 6-9.

The vehicle as seen in FIGS. 6-9, broadly considered, includes a body 74; a plurality of wheel assemblies 76, 78, 80, 82, 84, 86, 88 and 90; a plurality of endless tracks or belts 92, 94, 96 and 98; and drive means 100.

Body 74 includes a hull portion 102 and a portable cockpit cover 104. Wheel assemblies 76, 87, 80 and 82 are journalled in longitudinally spaced relation along one side of hull 102 and wheel assemblies 84, 86, 88 and 90 are journalled in longitudinally spaced relation along the other side of hull 102. Each wheel assembly includes a wheel 104 and a pneumatic tire 106 suitably mounted in the rim portion 104a of wheel 104 and inflatable on the wheel by the use of a fill valve assembly 108. Each tire 106 includes a central circumferential groove 106a extending completely around the tire. Wheel assemblies 82 and 90 are adjacent the front end of hull 102; wheel assemblies 76 and 84 are adjacent the rear end of hull 102; and wheel assemblies 78, 80 and 86, 88 are disposed at intermediate locations along hull 102.

Endless belt 92 is trained around wheel assemblies 76, 78; endless belt 94 is trained around wheel assemblies 80 and 82; endless belt 96 is trained around wheel assemblies 84 and 86; and endless belt 98 is trained around wheel assemblies 88 and 90. In each case, a longitudinal extending rib portion 110 on the inner periphery of the track guides in grooves 106a on the associated tires 106. Ribs 110 and grooves 106a have complementary truncated pyramidal configurations. Tracks, 92, 94, 96 and 98 may, for example, for formed of a fiber-reinforced neoprene rubber. The various wheel assemblies are of the same general size but the front wheel assemblies 82 and 90 are journalled on hull 102 at a location that is raised with respect to the other wheel assemblies so that the lower runs 94a and 98a of front tracks 94 and 98 slope upwardly toward the front of the vehicle and the upper runs 94b and 98b slope downwardly toward the rear of the vehicle. A continuous clear 112, generally corresponding to the clear 34 of the FIGS. 1-5 embodiment, is secured to or formed integrally with the outer surface of each endless track for purposes of providing propulsion forces on land and water. The cleat defines a zig-zag pattern extending about the entire circumference of the outer surface of the track with each zig disposed approximately 90 degrees with respect to each zag.

Alternatively, and as seen in FIGS. 8 and 9, the continous cleat 112 may be replaced by a series of discrete segments 114 secured to the outer surface of the track and arranged in a zig-zag pattern with each segment disposed at 90 degrees with respect to the next successive segment. The segments 114 may, for example, be formed of four-ply heavy duty water hose.

Drive system 100 includes an internal combustion engine 116; a fly-wheel 118 coupled to and driven by the engine; a double hydraulic pump 120 driven from fly-wheel 118; hyraulic motor wheels 122, 124, 126 and 128 respectively positioned in the hub portions 104b of the wheels 1-4 of wheel assemblies 76, 80, 84 and 88; and hydraulic conduit means 130 interconnecting the output of pump 120 with hydraulic motor wheels 122, 124, 126 and 128. Hydraulic motor wheels 122, 124, 126 and 128, in addition to driving the associated wheel assembly, also provide the means for journalling the associated wheel assembly on hull 102. The remaining wheel assemblies 78, 82, 86 and 90 are freely journalled on hub 102 by a suitable idler assembly. A hydraulic flow divider (not shown) is provided to hydraulically lock the two tracks on each side so that the two tracks on each side are driven in unison.

Suitable control means for the vehicle are illustrated schematically by a left stick 132 and a right stick 134 accessible to an operator positioned in the forward region of hull 102. When left stick 132 is pushed forwardly, motor wheels 126 and 128 are energized to drive tracks 96 and 98 and turn the vehicle to the right. When right stick 134 is pushed forwardly, motor wheels 122 and 124 are energized to drive tracks 92 and 94 and turn the vehicle to the left. When both sticks are pushed forwardly, the vehicle is driven forwarldy in a straight line. When both sticks are pulled back, the vehicle moves in reverse.

The all-terrain vehicle described in FIGS. 6-9 will be seen to provide many important advantages. specifically, the endless tracks 92, 94, 96 and 98 may be tightened on the associated wheel assemblies by simply selectively inflating the tires associated with the wheel assemblies through the fill valves 108. For example, inflating the tires to 5 pounds of gauge pressure has been found to provide adequate tensioning for the belts and yet provide a soft cushiony ride for the vehicle. The pressure of the tires of course may be selectively varied during usage to selectively adjust the tension to the particular environment in which the vehicle is operating and/or to compensate for wear in any of the various elements of the drive system. The use of two tracks on each side of the vehicle, independently driven, provides the further advantage that, if one track should fail, the other track on that side of the vehicle will continue to operate to propel the vehicle. Further, the hose segment construction shown in FIGS. 8 and 9, provides a simple and effective means for providing the cleat on the track. Specifically, the hose segments effectively propel the vehicle in water and provide effective shock absorbing action when the vehicle is operating on pavement. Further, the arrangement of eight tires, with six disposed in a common plane and the two front tires elevated slightly above that plane, facilitates movement of the vehicle through the water and facilitates easier steering on land. Steering of the vehicle on land may also be facilitated by equating the distance between the center lines of motor wheels 122 and 124 with the overall width of the vehicle measured from the outboard dimension of the left treads to the outboard dimension of the right treads. Further, the use of tires with a central circumferential groove coacting with a central rib on the inner periphery of the track provides a simple and effective means of precluding lateral movement of the track on the wheel assemblies and precluding dislodgement of the track from the wheel assemblies Other aspects, objects and advantages of this invention may be obtained from a study of the drawings, the disclosure and the appended claims.

I claim:

1. A tracked vehicle comprising:
   (A) a body;
   (B) four wheel assemblies, each including a wheel and a tire mounted on the wheel, journalled on said body on fixed axes at longitudinally spaced locations along each side of said body and including at each side of said body at least one wheel assembly adjacent the front of said body and another wheel assembly adjacent the rear of said body; and
   (C) first and second endless belts at each side of said body providing the sole means of ground engagement for said vehicle with the first endless belt trained around the tires of the set of wheel assemblies constituted by the two rearmost wheel assemblies and the second endless belt trained around the tires of the set of wheel assemblies constituted by the two forward wheel assemblies; and
   (D) the tires of each wheel assembly comprising a pneumatic tire and each wheel assembly including means for varying the air pressure within the respective pneumatic tire so that the tire pressures of each set of wheel assemblies may be selectively varied to selectively adjust the tension of the associated belt to match the particular environment in which the vehicle is operating and/or to compensate for wear in the total drive system.

2. A tracked vehicle according to claim 1 wherein:
   (E) a circumferential groove is provided in each tire; and
   (F) each endless belt has a longitudinally extending rib on the inner periphery thereof guiding in the circumferential groove of the associated penumatic tires.

3. A tracked vehicle according to claim 1 wherein:
   (E) said vehicle further includes a hydraulic motor positioned in the hub of the wheel of one wheel assembly of each set of wheel assemblies; and
   (F) the wheel of the other wheel assembly of each set of wheel assemblies is idly journalled on the body.

4. A tracked vehicle according to claim 3 wherein:
   (G) the axes of the three rearmost wheel assemblies on each side of said body lie in a common plane; and
   (H) the axis of the front wheel assembly on each side of said body is raised above said plane so that the lower runs of the endless belts trained around the tires of the two forward wheel assemblies slope upwardly toward the front end of the vehicle.

5. A track assembly comprising:
   (A) a body;
   (B) a set of first and second pneumatic tires journalled on said body at each side thereof at longitudinally spaced locations along the respective side, the outer circumferential surface of each tire being configured to provide a central circumferential radially inwardly extending groove bounded on each side by a generally planar annular surface generally parallel to the rotational axis of the tire and extending from a respective side of said groove to a respective side edge of the tire; and
   (C) an endless belt trained around each set of first and second tires, the inner circumferential surface of each belt being configured to provide a central circumferential radially inwardly extending rib complementary to and guiding in said grooves in the associated tires and bounded on each side by a generally planar annular surface generally parallel to the rotational axes of the associated tires and extending from a respective side of said rib to a respective side edge of said belt; whereby to provide a driving inter-engagement as between said planar surfaces on each set of tires and said planar surfaces on the associated belt to drive the belt in response to rotation of the tires and whereby to provide a guiding interaction as between said grooves on each set of tires and said rib on the associated belt to maintain the belts centered on the tires.

6. A tracked vehicle according to claim 5 wherein:
   (E) another set of first and second longitudinally spaced pneumatic tires are provided on each side of said body;
   (F) two endless belts are provided on each side of said body with each belt trained around a respective set of first and second tires so as to provide two endless belts at each side of said vehicle; and
   (G) said ribs and grooves have complementary truncated, pyramidal, cross sectional configurations.

* * * * *